United States Patent Office 3,428,943
Patented Feb. 18, 1969

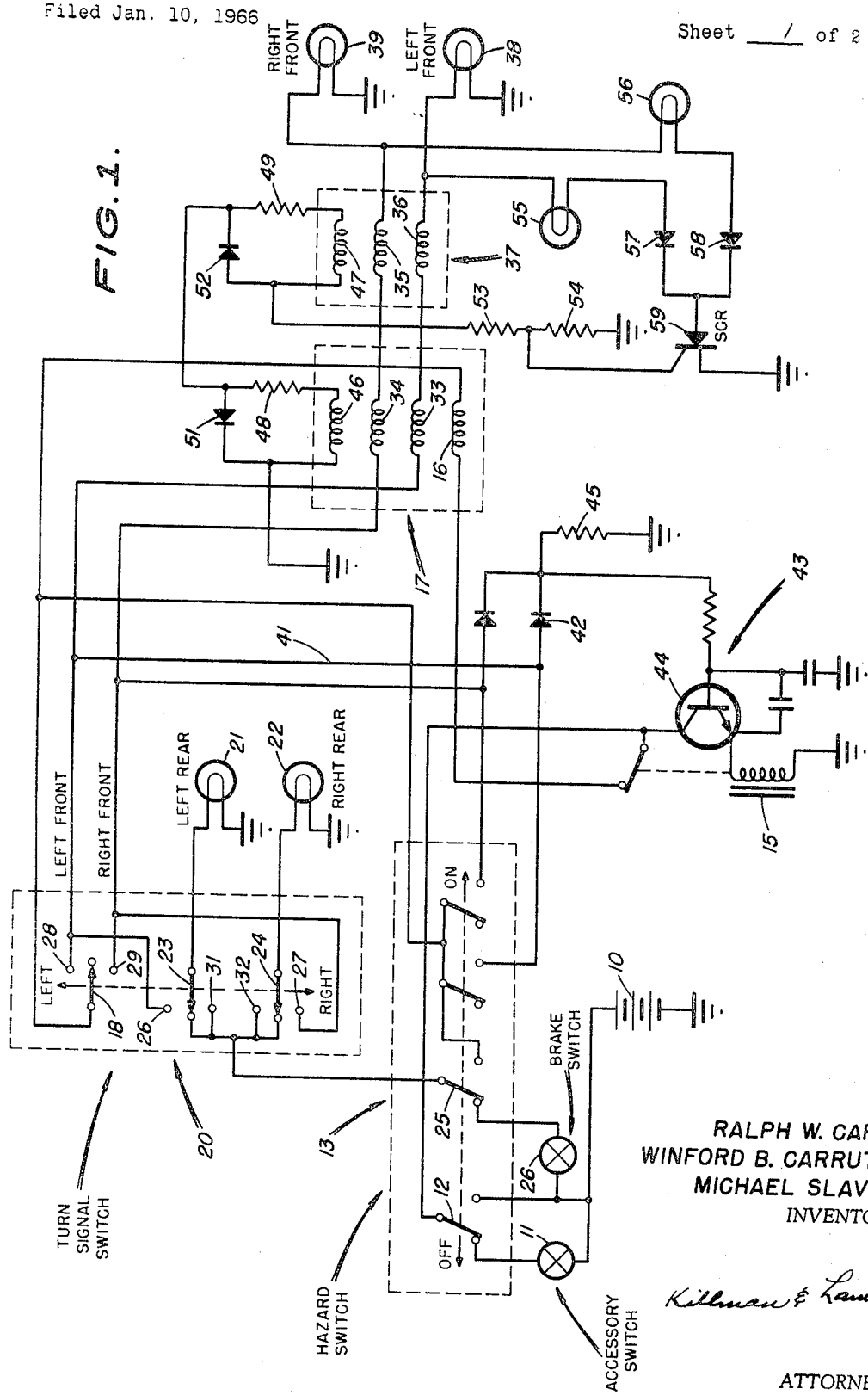

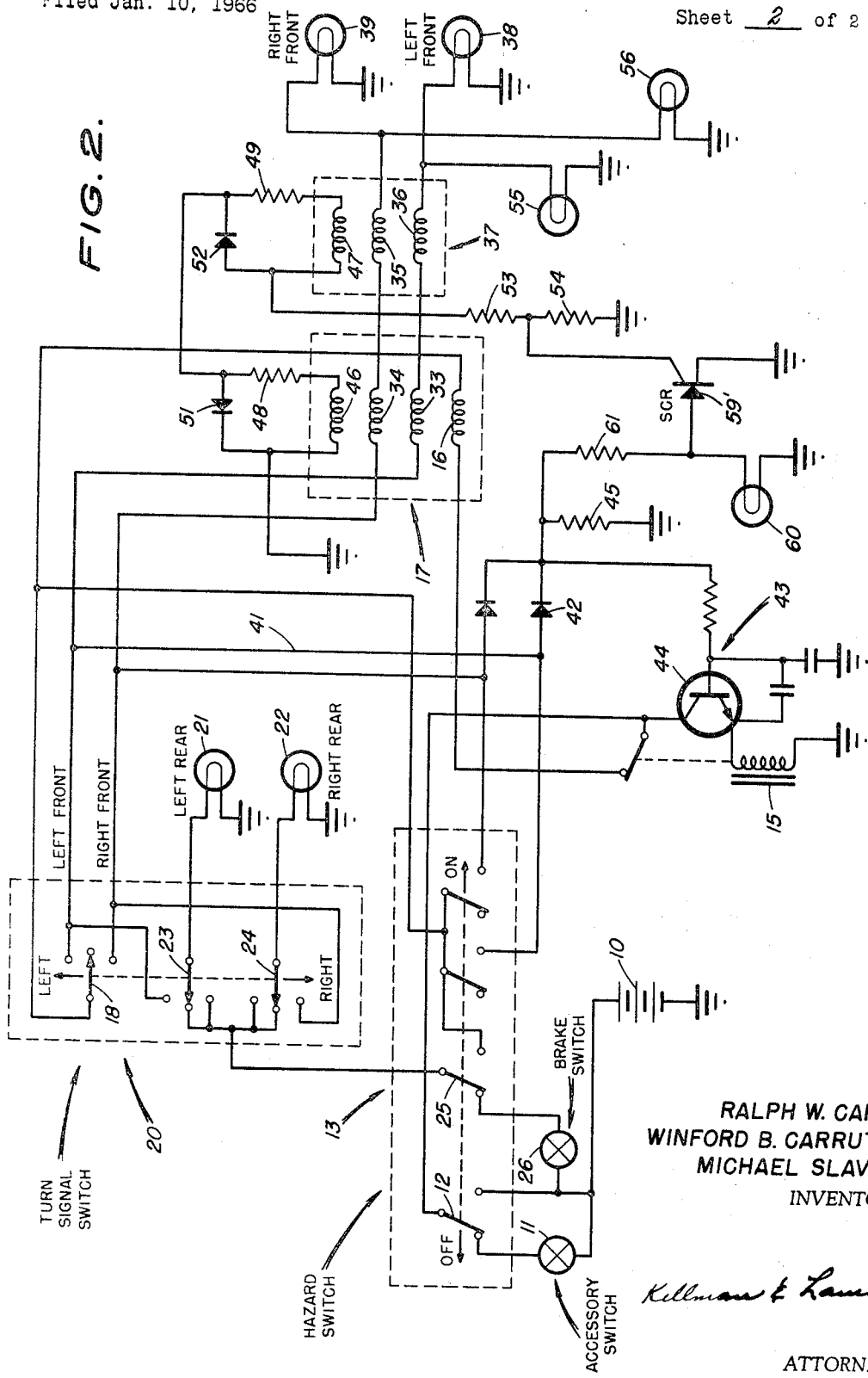

3,428,943
AUTOMOBILE TURN SIGNAL WITH LAMP
FAILURE INDICATOR
Ralph W. Carp, Winford B. Carruth, and Michael Slavin, Baltimore, Md., assignors to The Bendix Corporation, Baltimore, Md., a corporation of Delaware
Filed Jan. 10, 1966, Ser. No. 519,774
U.S. Cl. 340—80                                                6 Claims
Int. Cl. B60q 1/34, 3/04

ABSTRACT OF THE DISCLOSURE

A signal system for automobiles, including a brake switch, hazard switch, and turn signal switch, and in which a lamp failure indicator is controlled by a silicon controlled rectifier which is, in turn, controlled by the combined output of a pair of current responsive elements coupled, respectively, in the circuits to the front and rear signal lamps and to the front lamps.

---

The present invention relates to signal lamp circuits for automobiles. More particularly, it relates to flasher means for operating turn signal lamps at the front and rear of the automobile on either side or for operating the same lamps at all four corners of the vehicle simultaneously to signal a hazard condition.

The signal lamp flasher circuits most in use depend upon a bimetallic circuit breaker for cyclically opening and closing the lamp circuit. The breakers may be used in a series circuit in which the total lamp current passes through the breaker heating element or in a shunt circuit in which only a portion of the total current supplied to the lamp circuit passes through the breaker heater. In either circuit the breaker is sensitive to the load current so that the load current cannot be changed without affecting the frequency and duty cycle of the lamp flash. A load current reduction would occur, for example, if one of the signal lamps were to burn out. A load current increase occurs whenever the lamps at all four corners of the vehicle flash simultaneously. Therefore, it has been necessary to provide separate flasher units of different characteristics for use in the turn signal circuit and in the hazard warning circuit. Another shortcoming of load-sensitive thermal flashers is present in vehicles equipped with multiple lamps at one or more of the signal locations. For example, each of the rear signals may contain as many as three lamps. If two of the lamps should fail, the remaining one is still capable of providing a serviceable signal, yet the change in load current would ordinarily be so great as to cause a thermal flasher to fail to operate.

It is a simple matter to arrange a circuit using either a thermal flasher or other cyclic switching means in which the flash rate and duty cycle are independent of the signal lamp load. But such an arrangement overlooks the principal advantage of load-sensitive thermal flashers; namely, that the change in flasher rate and duty cycle which occurs with change in load advises the vehicle operator of a lamp outage. This change in flasher rate and duty cycle is noted by the operator either as a change in the audible clicks which accompany the flasher operation or as a change in the operation of an interior indicator lamp.

The primary object of this inventon is to provide flasher means for an automobile signal lamp circuit in which the flash rate and duty cycle are independent of the lamp load and which will provide an indication of lamp outage at any of the four corners of the vehicle.

A further object is to provide a single flasher unit which serves both the turn signal circuit and the hazard warning circuit.

An additional object is to provide a flasher means and a circuit arrangement operative to flash lamps simultaneously at all four corners of the vehicle regardless of the position of the turn signal selector switch or brake light switch.

Still other objects include the provision of lamp signalling means which commences operation with selected lamps in an "on" condition; to provide signalling means which draws no quiescent current; to provide an audible indication of signal operation; and to provide a rugged and reliable system.

Briefly, the present invention includes a relaxation type oscillator for timing periodic interruptions of the circuit through the signal lamps. The interior signal indicator is arranged to sense the current in the signal lamp circuit and if the current should drop to the amount drawn by only one lamp, a lamp outage is revealed to the vehicle operator by non-illumination of the signal indicator.

In the drawings:

FIG. 1 is a schematic diagram of the invention; and

FIG. 2 is a schematic diagram of a modification of the invention in which lamp outage is indicated separately from turn direction.

Referring to FIGURE 1, the signal lamp circuit commences at the automobile battery 10, runs through the ignition and accessory switch 11 to one contact 12 of a four pole-double throw switch 13, the function to which is to connect the signal lamps at the four corners vehicle simultaneously to the flasher to warn other vehicles of possibly dangerous conditions. The hazard signal is most often used when the vehicle must stop in a position obstructing traffic. Switch 13 is shown in the off position which permits selection of turn signals in the normal manner.

The circuit continues from switch arm 12 through normally closed contacts of an electromagnetic relay 15 and one winding of a transformer 17, later more fully described, to one arm 18 of the turn signal switch 20. The turn signal switch is shown in the neutral position. The left rear and right rear signal lamps 21, 22 are connected to separate arms 23, 24 of switch 20. In the neutral position, both rear lamps are connected through hazard switch arm 25 and the brake switch 26 to the battery, permitting both lamps to light upon application of the vehicle brakes. When a direction of turn is signalled, one of the arms 23 or 24 disconnects the rear lamp for the selected direction from the brake switch and connects that lamp through contacts 26 or 27 to the selected one of contacts 28 and 29 associated with switch arm 18. The rear lamp opposite the turn direction remains connected to the brake switch through contact 31 or 32.

The front signal lamp circuits extend from contacts 28 and 29 through separate windings 33 and 34 on transformer 16 and separate windings 35 and 36 on transformer 37, later to be described, to the signal lamps 38 and 39.

When a turn direction is selected, left, for example, battery voltage is applied through relay 15 and switch arm 18 to contact 28. Front lamp 38 and rear lamp 21, through contact 26 and arm 23, are both energized. At the same time, lead 41 supplies voltage through a diode 42 to a resistor-capacitor network 43. The network supplies bias to a transistor 44 connected as an emitter follower loaded by the winding of relay 15. The capacitor of network 43 commences to charge upon closing of switch 20 and after an interval reaches a value causing transistor 44 to conduct heavily enough to operate relay 15. The operation of relay 15 removes battery voltage from switch arm 18 and diode 42 so that the capacitor of network 43 then discharges through resistor 45 to such a level that conduction through transistor 44 is insufficient to hold the armature of relay 15. Relay 15 drops out, reapplying battery voltage to switch arm 18 and causing the capacitor of network 43 again to charge.

In this manner the signal lamps are caused to flash at a rate and duty cycle dependent upon the charge and discharge time constants of network 43, and the characteristics of transistor 44 and relay 15, but independent of the signal lamp load. Thus the lamp load may vary from two lamps, or more if more than one rear signal lamp is used, to four lamps or more without change in flash rate and duty cycle. The load fluctuation would be even greater if one or more of the signal lamps were to fail.

In conventional thermal flasher systems the change in flash rate and duty cycle accompanying a change in lamp load is used to indicate failure of a signal lamp. The purpose of transformers 17 and 37 is to sense variation in lamp load and provide means for indicating lamp failure. The total current supplied to both the front and rear lamps during a turn signal passes through winding 16. The current supplied the selected front lamp passes through winding 34 or 33, both of which are phased oppositely from winding 16. An output winding 46 on transformer 17 responds to the difference in magnetic flux generated by the two windings 16 and 33 or 34. If the signal lamp at the rear of the vehicle should fail, the total current is equal to the front lamp current and no output appears from winding 46. An output winding 47 on transformer 37 responds to the flux generated by current supplied to the selected front lamp alone. If a front lamp should fail, no output appears from winding 47. Windings 46 and 47 are loaded by resistors 48 and 49. The output voltages of the windings are limited by diodes 51 and 52 to the forward conduction voltage of the diodes (approximately 0.6 v.). Windings 46 and 47 are connected in series through resistors 48 and 49 to produce a total output at winding 47 equal to the sum of the limited outputs of the windings. This total output is applied to a voltage divider formed by resistors 53 and 54. Indicator lamps 55 and 56, located usually on the vehicle instrument panel, are connected from the lines supplying the front signal lamps through isolating diodes 57 and 58 to the anode of a silicon controlled rectifier 59. The gate electrode of SCR 59 receives the divided output voltage from transformer windings 46 and 47.

Assuming that both front and rear signal lamps are operative, the total output voltage from windings 46 and 47 is approximately 1.2 v. When this voltage is divided by resistors 53 and 54, suitably to approximately 0.8 v., SCR 59 is triggered into conduction, completing the circuit for the selected indicator lamp, say lamp 56, through diode 58 to ground and causing the indicator lamp to be illuminated. Interruption of the supply voltage by relay 15 removes power from the indicator lamps 55 and 56, as well as the front and rear signal lamps and causes the SCR 59 to return to a non-conductive state. As long as signal is provided at both the front and rear of the vehicle, the indicator lamp for the selected turn direction will flash in synchronism with the signal lamps. If the rear of the vehicle is dark due to lamp failure, no output will be generated by winding 46 and the output of winding 47 then divides between resistors 48, 53 and 54. Suitably, the values of these resistors are related in such manner that only approximately 0.2 v. is then applied to the gate electrode of SCR 59. This reduced gate voltage is insufficient to trigger the SCR and therefore no conductive path is completed for the indicator lamp 55 or 56 on the side of the selected turn direction. Similarly if the front signal lamp should fail, no output is generated by winding 47 and the output of winding 46 must then divide between resistors 49, 53 and 54. Again there will be insufficient voltage to trigger SCR 59, and the indicator lamp for the selected turn direction will not be illuminated. Thus, if an indicator lamp fails to respond upon signalling a turn, the vehicle operator is alerted to the fact that one of the corners of the vehicle is dark.

In the modification of FIG. 2 a separate indicator lamp is provided which flashes to indicate the failure of a signal lamp. This circuit differs from that of FIG. 1 in the connection of indicator lamps 55 and 56 in parallel with the front signal lamps 38 and 39 so as to flash in synchronism with relay 15, regardless of the operability of the front or rear signal lamps. The circuit of transformers 17 and 37 is unchanged from FIG. 1, so that gate voltage for SCR 59' is developed only when signal lamps are operative at both the front and rear of the vehicle. A third indicator lamp 60, located within sight of the vehicle operator is connected through a current limiting resistor 61 to the high side of resistor 45. The anode of SCR 59' is connected to the high side of lamp 60 and the cathode is grounded so that lamp 60 is shorted out for each conduction cycle of the SCR. Therefore, as long as both front and rear signal lamps are operative, indicator lamp 60 will not be illuminated. Should the signal lamp or lamps at one of the corners of the vehicle fail, trigger voltage will not be developed for SCR 59' and indicator lamp 60 will flash in synchronism with relay 15 to call the attention of the vehicle operator to the lamp outage.

In either of the embodiments disclosed in FIGS. 1 and 2 it is possible in multiple lamp installations to design the system to indicate failure of one, two or all of the signal lamps by proper adjustment of the turns ratio of winding 16 to windings 33 and 34 of transformer 17. For example, in a vehicle employing one signal lamp at each front corner and three signal lamps at each rear corner, 1:1 turns ratio between windings 16 and 33 and 34 causes no indication of lamp failure to be given until all of the signal lamps at one of the rear corners are out. If the turns of winding 16 are in the ratio of 1:2 to the turns of windings 33 and 34, a warning of signal lamp failure will be given when two of the three lamps at either of the rear corners fail. In both designs, failure of either of the front signal lamps produces an outage indicaton.

The invention claimed is:
1. A directional signal for motor vehicles comprising:
signal lamps at the left front and rear and right front and rear corners of the vehicle;
means providing a cyclically interrupted source of power;
a selector switch for selectively connecting said left front and rear lamps or said right front and rear lamps to said source of power;
first current responsive means providing an output related to the difference between the total current flowing to lamps at both front and rear corners of a selected side of said vehicle and the current flowing to a lamp at one corner of said selected side of said vehicle;
second current responsive means providing an output related to the current flowing to said lamp at one corner of said vehicle;
an indicator lamp; and
means combining the outputs of said first and second current responsive means for controlling current in said indicator lamp to provide an indication of signal lamp failure upon the absence of output from either said first or said second current responsive means.
2. A signal system as claimed in claim 1, wherein said means providing a cyclically interrupted source of power comprises
a battery;
a switching relay for interrupting the load circuit to said battery; and
a timing network including a capacitor, said capacitor being charged from said battery to a voltage sufficient to operate said relay and thereafter discharging to return said relay to its initial condition.

3. A signal system as claimed in claim 1 wherein said first and second current responsive means comprise, respectively,
- a first transformer having a first winding carrying said total current, a second winding differentially connected with respect to said first winding and carrying said current to said lamp at one corner, and a third winding from which the output of said transformer is taken; and
- a second transformer having a first winding carrying said current to said lamp at one corner and a second winding from which the output of said transformer is taken.

4. A signal system as claimed in claim 3, with additionally
- first and second limiter diodes respectively connected in circuit with the output windings of said first and second transformers.

5. A signal system as claimed in claim 4 wherein said means for combining the outputs of said current responsive means includes
- a circuit serially connecting said first and second limiter diodes to provide the sum of the outputs of said diodes; and
- a controlled rectifier having a control electrode supplied from the circuit of said diodes, said rectifier having other electrodes in circuit with said indicator lamp and blocking conduction through said lamp as long as the voltage applied to said control electrode is insufficient to render said rectifier conductive.

6. A signal system as claimed in claim 4 wherein said means for combining the outputs of said current responsive means includes
- a circuit serially connecting said first and second limiter diodes to provide the sum of the outputs of said diodes; and
- a controlled rectifier having a control electrode supplied from the circuit of said diodes, said rectifier having other electrodes in circuit with said indicator lamp for short circuiting said lamp upon conduction of said rectifier.

References Cited

UNITED STATES PATENTS

| 3,002,127 | 9/1961 | Grontkowski | 340—81 X |
| 3,171,096 | 2/1965 | Murray et al. | 340—69 |

FOREIGN PATENTS

| 711,361 | 6/1954 | Great Britain. |
| 816,010 | 7/1959 | Great Britain. |

JOHN W. CALDWELL, *Primary Examiner.*

K. N. LEIMER, *Assistant Examiner.*

U.S. Cl. X.R.

340—55, 81, 251